US008154603B2

(12) United States Patent
Shioji

(10) Patent No.: US 8,154,603 B2
(45) Date of Patent: Apr. 10, 2012

(54) IMAGING DEVICE TRANSFERRING DATA TO EXTERNAL DEVICE

(75) Inventor: Masahiro Shioji, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 602 days.

(21) Appl. No.: 12/188,642

(22) Filed: Aug. 8, 2008

(65) Prior Publication Data

US 2009/0040313 A1 Feb. 12, 2009

(30) Foreign Application Priority Data

Aug. 8, 2007 (JP) ................................ 2007-207282

(51) Int. Cl.
H04N 5/225 (2006.01)
(52) U.S. Cl. ..................................................... 348/207.1
(58) Field of Classification Search ................ 348/231.2, 348/207.1, 333.13, 372, 208.16
See application file for complete search history.

(56) References Cited

U.S. PATENT DOCUMENTS

| 7,724,281 | B2 * | 5/2010 | Vale et al. ................... 348/207.1 |
| 7,734,938 | B2 * | 6/2010 | Kim ............................... 713/320 |
| 2002/0021372 | A1 * | 2/2002 | Konda et al. ................... 348/730 |
| 2002/0186317 | A1 * | 12/2002 | Kayanuma ..................... 348/373 |
| 2004/0259605 | A1 * | 12/2004 | Quigley et al. ................ 455/574 |
| 2006/0017811 | A1 * | 1/2006 | Mizutani .................... 348/207.1 |
| 2006/0238236 | A1 * | 10/2006 | Terayama ...................... 327/544 |
| 2006/0244833 | A1 * | 11/2006 | Abe et al. .................... 348/207.1 |
| 2007/0030358 | A1 * | 2/2007 | Aoyama ...................... 348/231.2 |
| 2007/0247551 | A1 * | 10/2007 | Raines ............................ 348/563 |
| 2008/0273096 | A1 * | 11/2008 | Senda ......................... 348/231.7 |

FOREIGN PATENT DOCUMENTS

JP 2006-067506 A 3/2006

OTHER PUBLICATIONS

Chinese Office Action dated Feb. 24, 2011, issued in corresponding Chinese Patent Application No. 200810161170.2.

* cited by examiner

Primary Examiner — Lin Ye
Assistant Examiner — Amy Hsu
(74) Attorney, Agent, or Firm — Westerman, Hattori, Daniels & Adrian, LLP

(57) ABSTRACT

An imaging device comprises an interface for connecting an external recording device, a control circuit for controlling data communication with the external recording device connected to the interface, and an information storage. The control circuit comprises a connection establisher for realizing a connection established status with the external recording device, an information supplier for supplying the data management information stored in the information storage to the external recording device, and a connection canceller for canceling the connection established status before or at the time of setting the device main body to the electric power saving mode, after making the information supplier execute the data management information supply operation or after completion of the data management information supply operation by the information supplier.

16 Claims, 6 Drawing Sheets

IMAGING DEVICE TRANSFERRING DATA TO EXTERNAL DEVICE

The priority application Number 2007-207282, upon which this patent application is based, is hereby incorporated by reference.

BACKGROUND OF THE INVENTION

1. Field of the Invention

The present invention relates to imaging devices equipped with an imaging function, such as electronic cameras e.g. digital cameras, and particularly to imaging devices which control data communication with external recording devices connected thereto.

2. Description of Related Art

When connecting a typical electronic camera and the like to other devices, it is usually connected through a USB (Universal Serial Bus) interface. According to the USB standard, a host which has a host controller polls (queries) a device connected to the host, thereby performing the communication between the host and the device. All the communications are controlled by the host and thus the devices cannot poll the host.

Generally, when transferring imaging data obtained by an imaging operation of an electronic camera to an external recording device through a USB cable, the electronic camera is connected to a personal computer (PC) which is connected to the external recording device and then the imaging data is transferred to the external device via the PC. Therefore, the PC is the host and the electronic camera and the external recording device are the devices. The PC controls all the communications and transfers the imaging data from the electronic camera to the external recording device. Thus, transferring imaging data taken with an electronic camera to an external recording device always needs the intermediary of PC, which requires vexatiousness of starting PC and the like.

There has been proposed an imaging device capable of performing data communication with an external device without the intermediary of PC.

Generally, when a host equipment and a device equipment are connected to each other through a USB interface, the host equipment and the device equipment send a query command and a reply command to each other in conformity with the USB standard to thereby establish the connection therebetween. Also, when the connection between the host equipment and the device equipment is canceled, the host equipment and the device equipment send a query command and a reply command to each other in conformity with the USB standard to thereby cancel the connection therebetween. Thus, in the case where an external recording device as the device equipment is connected to the host equipment, and the connection is established between the both equipments, if the user unplugs a USB connector from one of the equipments in error and thereby physically disconnects the equipments, then the stored data recorded in the external recording device can be destroyed.

However, in the conventional imaging device capable of performing data communication with an external device without the intermediary of PC, no countermeasures are taken to prevent stored data recorded in the device equipment from being destroyed by physical disconnection in the connection established status as described above.

SUMMARY OF THE INVENTION

Hence an object of the present invention is to provide an imaging device which can prevent problems such as destruction of stored data recorded in an external recording device connected thereto.

An imaging device according to the present invention comprises:

an interface for connecting an external recording device;

a control circuit for controlling data communication with the external recording device connected to the interface; and an information storage for storing data management information of the data recorded in the external recording device.

The control circuit comprises:

a connection establisher for realizing a connection established status by performing a connecting process to establish connection with the external recording device;

an information acquirer for acquiring the data management information from the external recording device to store the data management information in the information storage in the connection established status;

an information supplier for supplying the data management information stored in the information storage to the external recording device in the connection established status;

an electric power saving mode setter for setting the device main body to an electric power saving mode in which operation of part of the device main body stops; and a connection canceller for canceling the connection established status before or at the time of setting the device main body to the electric power saving mode after making the information supplier execute the data management information supply operation or after completion of the data management information supply operation by the information supplier.

In particular, the connection canceller cancels the connection established status after making the information supplier execute the data management information supply operation if it has not executed, or after completion of the data management information supply operation if it is in execution.

In the imaging device according to the present invention, before or at the time of setting the device main body to the electric power saving mode, after the latest data management information is surely supplied, the connection established status is canceled. Therefore, while the device main body is in the electric power saving mode, even if the user unplugs the cable mistaking the electric power saving mode for the power source OFF status, the stored data recorded in the external recording device will not be destroyed.

More particularly, the control circuit has an electric power saving mode canceller for canceling the electric power saving mode, and the connection establisher executes the connecting process when the electric power saving mode is canceled by the electric power saving mode canceller.

According to the particular structure described above, when the electric power saving mode is canceled, the device main body automatically returns to the connection established status. Thus, no operation for returning the device main body to the connection established status is required.

As described above, according to the imaging device of the present invention, when an external recording device is connected to the imaging device, problems such as destruction of stored data recorded in the external recording device can be prevented.

BRIEF DESCRIPTION OF THE DRAWINGS

FIG. 4 is a flow chart showing the procedure performed in an electronic camera which constitutes the imaging device with the power source set to ON;

DETAILED DESCRIPTION OF THE EMBODIMENTS

In this embodiment, as an example of the imaging device, an imaging device including an electronic camera and a cradle is described.

Figure 1:
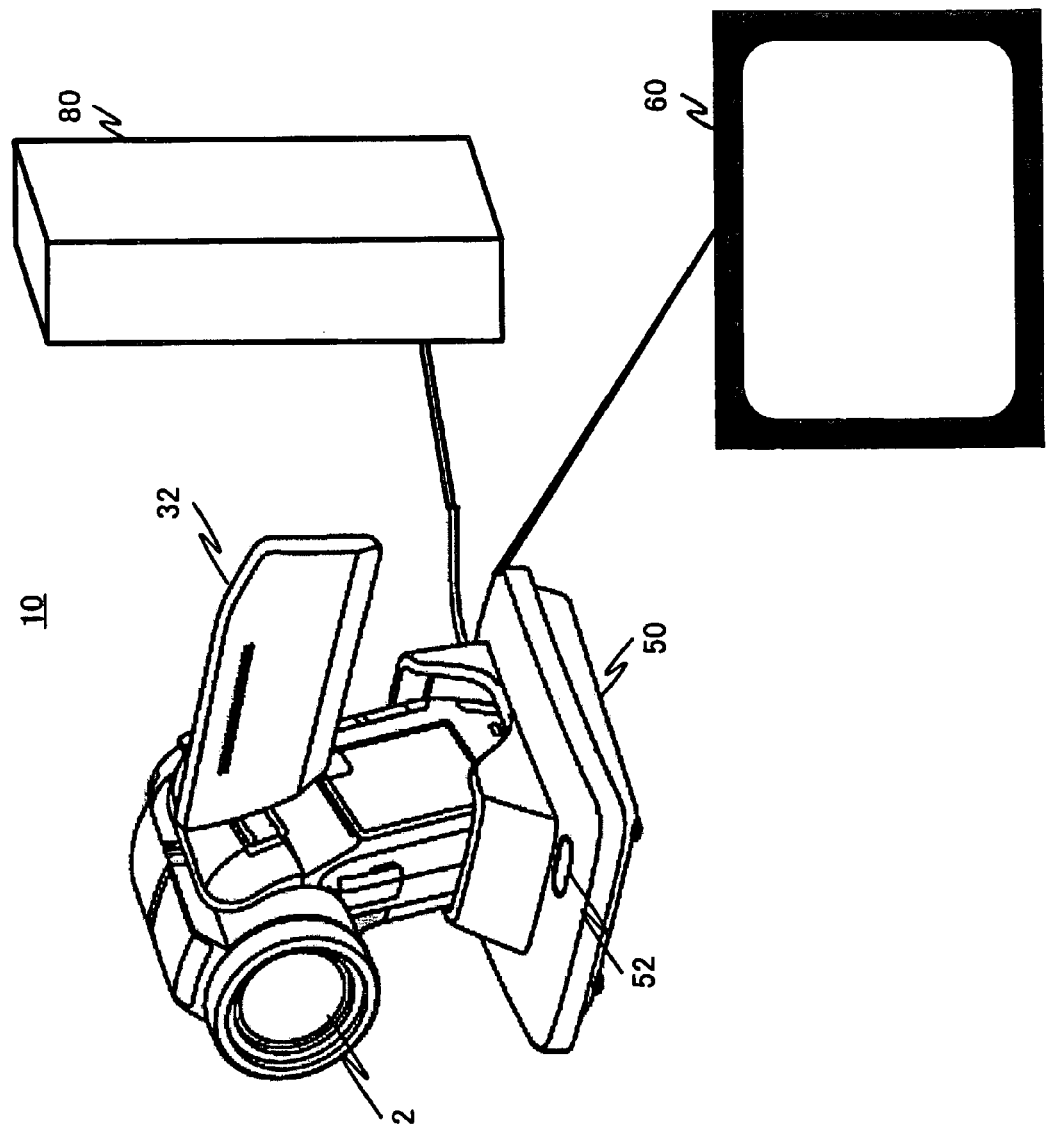
FIG. 1 is an outline view showing an imaging device of the present invention with a hard disk device and a TV monitor connected thereto.

FIG. 1 shows an imaging device according to the present invention provided with a hard disk device 80 and a TV monitor 60 connected thereto. The imaging device according to the present invention includes an electronic camera 10 and a cradle 50 to put the electronic camera thereon as shown in the figure, and the electronic camera 10 transmits and receives data to and from the hard disk device 80 and the TV monitor 60 via the cradle 50.

Figure 2:
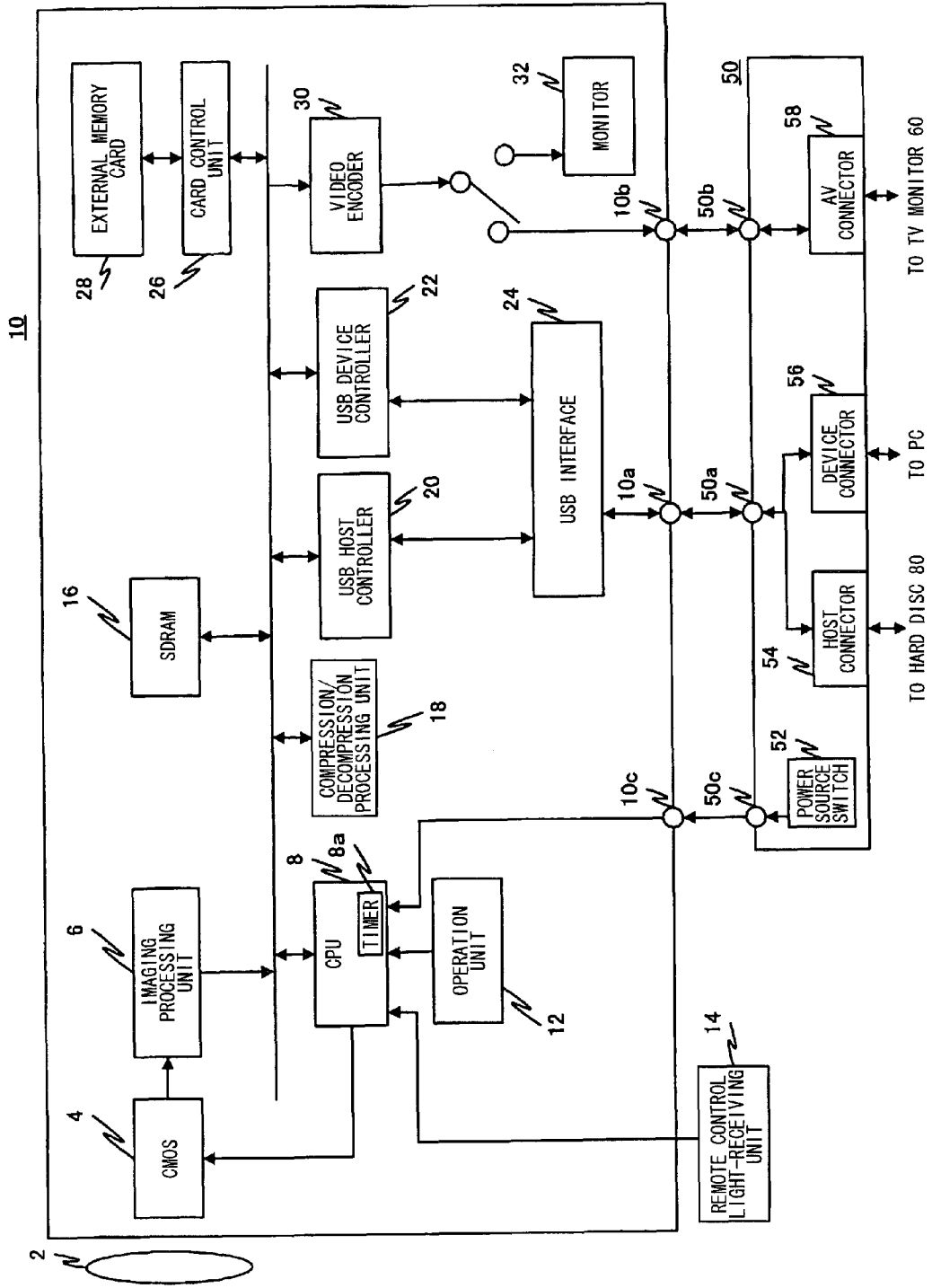
FIG. 2 is a block diagram illustrating the structure of the imaging device.

FIG. 2 is a block diagram illustrating the structure of the electronic camera 10 and the cradle 50. Details of the electronic camera 10 and the cradle 50 are described below with reference to FIG. 2. The electronic camera 10 is provided with an imaging lens 2, a CMOS image sensor 4, an imaging processing section 6, a CPU 8, a USB terminal 10a, an image output terminal 10b, a power source switch terminal 10c, an operation section 12, a remote control light receiving section 14, an SDRAM 16, a compression/decompression processing section 18, a USB host controller 20, a USB device controller 22, a USB interface 24, a card control section 26, an external memory card 28, a video encoder 30 and a monitor 32.

The imaging lens 2 provides an image of an optical image of an object on an imaging area of the CMOS image sensor 4 which is an imaging element. An analog imaging signal outputted from the CMOS image sensor 4 is subjected to imaging processing by the imaging processing section 6 and then converted into a Y signal which is a luminance signal and U and V signals which are color difference signals. The location of the imaging lens 2 in the direction of light axis is adjusted based on the output signals of the CMOS image sensor 4.

The CPU 8 is connected to the imaging processing section 6, the operation section 12, the remote control light receiving section 14, the SDRAM 16, the compression/decompression processing section 18, the USB host controller 20, the USB device controller 22, the card control section 26, the video encoder 30 and the power source switch terminal 10c. The CPU 8 controls the imaging processing section 6, the SDRAM 16, the compression/decompression processing section 18, the USB host controller 20, the USB device controller 22, the card control section 26 and the video encoder 30 in accordance with a program stored in an internal memory which is not shown in the figures. A timer 8a built in the CPU 8 counts time and sets a time-out flag which shows a time out status when counting a predetermined time is completed.

An imaging process and a reproduction process by the CPU 8 are executed in response to a predetermined operation to the operation section 12. For more particular description of the imaging process, the CPU 8 compresses a taken movie and picture by means of the compression/decompression processing section 18, and then records the compressed movie data and picture data as a movie file and picture file in the external memory card 28. For more particular description of the reproduction process, the CPU 8 decompresses the movie file and picture file recorded in the external memory card 28 by means of the compression/decompression processing section 18, and then converts them into analog image signals such as NTSC signals by means of the video encoder 30 to output them to the monitor 32 or the image output terminal 10b. The SDRAM 16 is used for temporary storage of data in such an imaging process and a reproduction process.

The USB terminal 10a, the image output terminal 10b and the power source switch terminal 10c that are provided in the electronic camera 10 can be connected to the cradle 50. The USB terminal 10a is connected to the USB interface 24 in the electronic camera 10, while the USB host controller 20 and the USB device controller 22 are connected to the USB interface 24 in parallel.

The cradle 50 is provided with a USB terminal 50a, an image input terminal 50b and a power source switch terminal 50c to be connected to the USB terminal 10a, the image output terminal 10b and the power source switch terminal 10c respectively, and a host connector 54 and a device connector 56 are connected to the USB terminal 50a in parallel. A power source switch 52 and an AV connector 58 are connected to the image input terminal 50b and the power source switch terminal 50c respectively.

The host connector 54 can have an external recording device equipped with a device function such as the hard disk device 80 connected thereto through a USB cable. When the hard disk device 80 is connected to the host connector 54, the movie file and picture file can be recorded in the hard disk device 80 via the cradle 50. The device connector 56 can have a personal computer (PC) equipped with a host function connected thereto. The AV connector 58 can have the TV monitor 60 connected thereto. When the TV monitor 60 is connected to the AV connector 58, the movie file and picture file recorded in the external memory card 28 can be outputted to the TV monitor 60 via the cradle 50 to display the movie and picture. In particular, in the reproduction process described above, the analog image signals outputted from the image output terminal 10b are supplied to the AV connector 58 to be outputted to the TV monitor 60.

Figure 3:
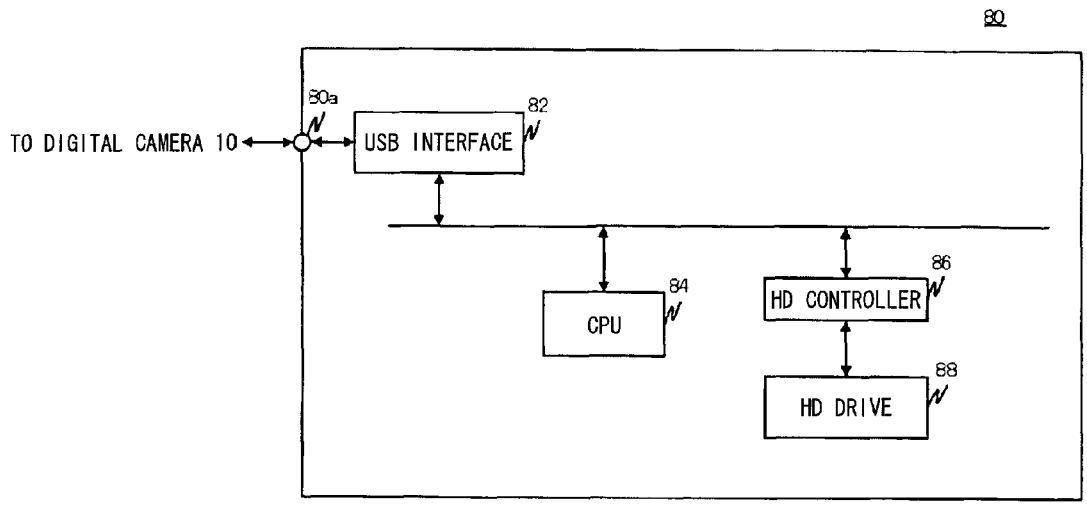
FIG. 3 is a block diagram illustrating the structure of the hard disk device.

Now referring to FIG. 3, the hard disk device 80 is described below. FIG. 3 is a block diagram illustrating the structure of the hard disk device 80. The hard disk device 80 is provided with a USB terminal 80a, a USB interface 82, a CPU 84, an HD controller 86 and an HD drive 88. The USB interface 82 and the HD controller 86 are connected to the CPU 84, which controls the USB interface 82 and the HD controller 86 in accordance with a program stored in a memory which is not shown in the figure.

After putting the electronic camera 10 on the cradle 50 connected to the hard disk device 80 with the power source of the camera set to OFF as shown in FIG. 1, upon operation of the power source switch 52 on the cradle 50, the power source of the camera is set to ON and then the connection establishing process is executed to establish the connection between the electronic camera 10 and the hard disk device 80.

To be specific, when the power source switch 52 is operated, the CPU 8 shown in FIG. 2 detects the operation and sets the power source of the camera to ON. When the power source of the camera main body is set to ON, the CPU 8 detects a voltage applied to the host connector 54 via the USB interface 24, thereby detecting that the device equipment (the hard disk device 80) is connected to the host connector 54. At the same time, the device equipment (the hard disk device 80)

detects the voltage via the USB interface 82, thereby detecting that the electronic camera 10 which is the host equipment is connected thereto.

And then, the CPU 8 controls the USB host controller 20 and sends a query command to the connected device equipment (the hard disk device 80) to inquire what kind of driver the equipment is controlled by. The device equipment (the hard disk device 80) sends a reply command to the electronic camera 10 in response to the query command replying that the equipment is controlled by the driver of the hard disk device 80. Thus the electronic camera 10 recognizes what kind of driver the device equipment (the hard disk device 80) is communicable with and establishes connection with the hard disk device 80. Once the connection is established, all the data communications between the electronic camera 10 and the hard disk device 80 is controlled by the electronic camera 10. The electronic camera 10 according to this embodiment is provided with the driver of the hard disk device 80. In this embodiment, the host mode process described above is executed. The establishment of connection between the host equipment and device equipment is in conformity with the USB standard and therefore not described here in detail.

In data transmitting and receiving process between the electronic camera 10 and the hard disk device 80 between which the connection is established, the CPU 8 of the electronic camera 10 controls the USB host controller 20 and sends a request command to the hard disk device 80 requesting transfer of FAT (File Allocation Tables) information recorded in a hard disk (not shown). The hard disk device 80 receives the request command through the USB interface 82 and the CPU 84 analyzes the request command and then controls the HD controller 86 to read out the FAT information from the hard disk by means of the HD drive 88, and sends a reply command including the read FAT information to the electronic camera 10. The FAT information is then stored in the SDRAM 16, whereby the electronic camera 10 can manage data of the hard disk device 80.

Operations of the electronic camera 10 and the hard disk device 80 in recording in the hard disk device 80 via the cradle 50 the movie file and picture file recorded in the external memory card 28 are described below. The CPU 8 of the electronic camera 10 first analyzes the FAT information of the hard disk device 80 stored in the SDRAM 16. And then after determining how to write data in the hard disk of the hard disk device 80, the CPU 8 controls the card control section 26 to read out the movie file or picture file from the external memory card 28. Subsequently the CPU 8 controls the USB host controller 20 to output the movie file or picture file to the USB terminal 10*a* from the USB interface 24 and to supply the movie file or picture file from the host connector 54 to the hard disk device 80 via the USB terminal 50*a* of the cradle 50. During this process, a request command and a reply command transmission and reception are conducted in conformity with the USB standard between the electronic camera 10 and the hard disk device 80. Then, by updating the FAT information stored in the SDRAM 16 and controlling the USB host controller 20, the updated FAT information is supplied to the hard disk device 80. The HD drive 88 of the hard disk device 80 shown in FIG. 3 records the supplied movie file or picture file in the hard disk and then writes and records the supplied FAT information over the FAT information previously recorded in the hard disk.

The electronic camera 10 can output the movie file and picture file recorded in the external memory card 28 to the PC connected to the device connector 56 of the cradle 50. In such a case, in establishing connection between the host equipment and the device equipment, the PC is the host equipment and the electronic camera is the device equipment. In the electronic camera 10, when a transfer request of the file recorded in the external memory card 28 from the PC equipped with a host function is received by the USB device controller 22, the CPU 8 controls the card control section 26 in accordance with the content of the received request, reads out the movie file or picture file recorded in the external memory card 28, and controls the USB device controller 22, thereby outputting the movie file or picture file from the USB interface 24 to the USB terminal 10*a*. The outputted file is supplied to the PC via the cradle 50 and the device connector 56. In this embodiment, the device mode process described above is executed.

When the power source OFF operation of the electronic camera 10 is executed, the CPU 8 controls the USB host controller 20 to execute the connection established status canceling process and then sets the power source of the device main body to OFF. When the connection established status with the hard disk device 80 is canceled, the CPU 8 erases the FAT information of the hard disk device 80 stored in the SDRAM 16.

The electronic camera 10 can set an electric power saving mode in which operation of part of the circuits constituting the camera main body stops. In the connection established status between the hard disk device 80 and the electronic camera 10, when the CPU 8 determines no operation is made to the operation section 12 or no remote controller signal is received by the remote control light receiving section 14 within the predetermined time with which the built-in timer 8*a* times out, it executes the process for canceling the connection established status between the hard disk device 80 and the electronic camera 10 and then shifts the camera main body from the usual operation mode to the electric power saving mode.

The connection canceling process between the hard disk device 80 and the camera is executed before the camera is shifted to the electric power saving mode for the following reasons. When the electronic camera 10 is in the electric power saving mode, the display on the monitor 32 of FIG. 1 is not shown, therefore, it is difficult for the user to find out whether the camera main body is in the electric power saving mode or the power source is set to OFF. Therefore, even though the electronic camera 10 is in the electric power saving mode, it can be mistaken for the power source OFF status and the electronic camera 10 can be removed from the cradle 50 mistakenly by the user. Thus, when connection is established between the electronic camera 10 which is the host equipment and the hard disk device 80 which is the device equipment, forceful cancellation of the connection established status between the equipments can lead failure of operation of supplying the latest FAT information stored in the SDRAM 16 of the electronic camera 10 to the hard disk device 80 or interruption thereof, which can result in destruction of the stored data, for example, the data stored in the hard disk device 80 becoming unreadable.

The electronic camera 10 according to this embodiment therefore executes the connection canceling process with the hard disk device 80 before the camera main body is shifted to the electric power saving mode. In the connection canceling process, the CPU 8 disconnects the hard disk device 80 after the USB host controller 20 executes a FAT information supply operation if the USB host controller 20 has not supplied the latest FAT information to the hard disk device 80, or after a FAT information supply operation is completed if the USB host controller 20 is in the process of the FAT information supply operation.

Now referring to the flowcharts of FIGS. 4 to 6, an operation of the CPU 8 of the electronic camera 10 in this embodiment is described below.

Figure 4:
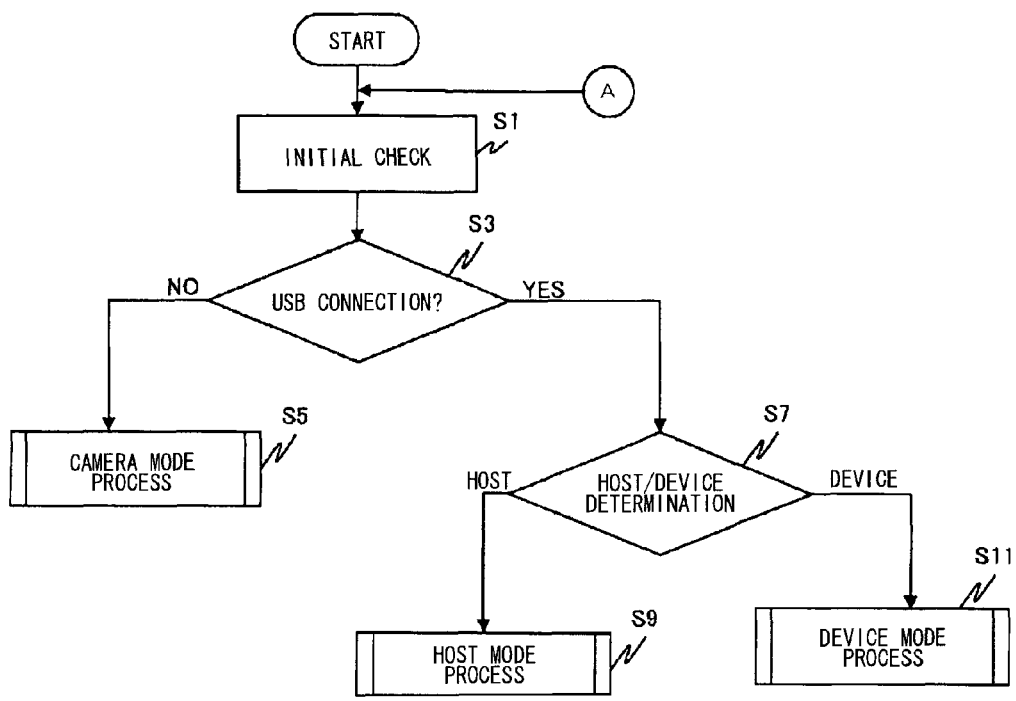

FIG. 4 illustrates a procedure performed by the CPU 8 with the power source of the camera main body set to ON. When the power source of the camera main body is set to ON in response to a power source ON operation to the operation section 12, reception of a power source ON signal by the remote control light receiving section 14, or an operation to the power source switch 52 with the camera put on the cradle 50, first, an initial check is performed as to the remaining battery level, remaining capacity of the external memory card 28 and the like in step S1. And then, proceeding to step S3, the CPU 8 determines whether or not a voltage is applied to the USB host connector 54 or the device connector 56 through the USB interface 24. When it determines NO in the step S3, it further proceeds to step S5 and performs a process in a usual electronic camera such as imaging and reproduction as described above.

When it determines YES in the step S3, it further proceeds to step S7 and determines which of the host connector 54 or the device connector 56 the voltage is applied to. When it determines that the voltage is applied to the device connector 56, it further proceeds to step S11 and performs the device mode process described above, while it proceeds to step S9 and performs the host mode process to be described below when it determines that the voltage is applied to the host connector 54.

Figure 5:
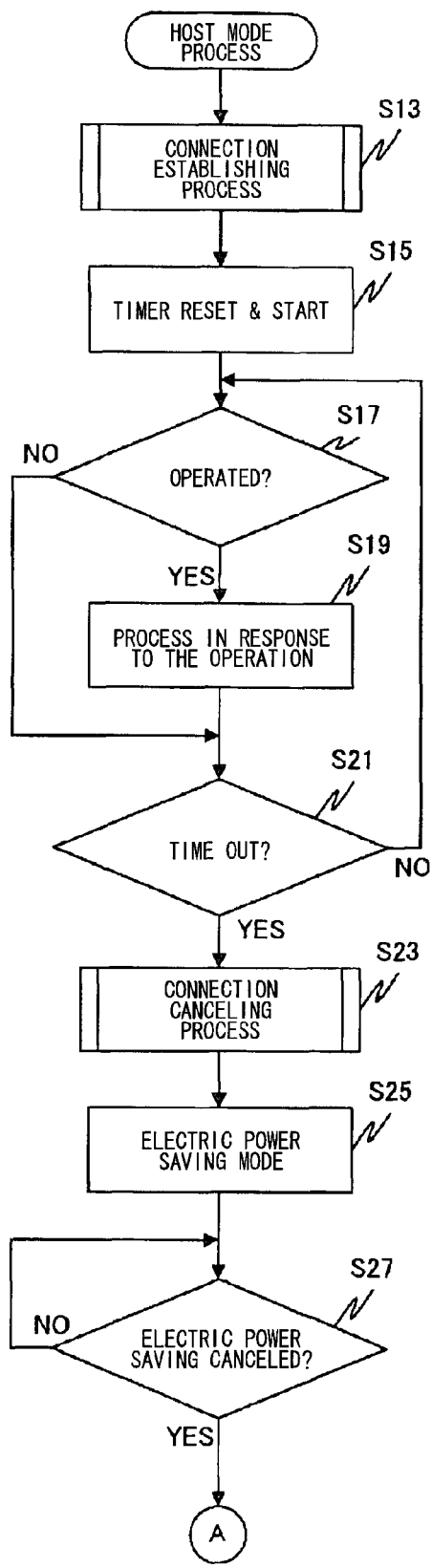
FIG. 5 is a flow chart showing the practical procedure in the host mode process by the electronic camera.

Referring to FIG. 5, an operation of the CPU 8 in the host mode process is described below. First, in step S13, the CPU 8 performs the connection establishing process with the hard disk device 80. And then proceeding to step S15, it resets the timer 8a in the CPU 8 and then starts the timer. Then proceeding to step S17, it determines whether or not there is an operation to the operation section 18 or a receipt of a remote control signal by the remote control light receiving section 14. When it determines YES in step S17, it proceeds to step S19 and performs the process in response to the operation to the operation section 18 or the received remote control operation signal, followed by proceeding to step S21. When it determines NO in step S17, it proceeds to step S21 bypassing step S19.

In step S21, it determines whether or not the timer 8a is in a time out status. When it determines NO, it returns to step S17 and repeats the processes of steps S17 to S21 until it determines YES in step S21. Once it determines YES in step S21, it proceeds to step S23 and performs the connection canceling process for canceling the connection established status with the hard disk device 80, followed by proceeding to step S25 to shift the camera main body from the usual operation status to the electric power saving mode.

Subsequently, it proceeds to step S27 and determines whether or not an operation for canceling the electric power saving mode is performed. To be specific, it determines whether or not there is an operation to the operation section 18 or a receipt of a remote control operation signal by the remote control light receiving section 14. It repeats the process of step S27 until it determines that an operation for canceling the electric power saving mode is performed. When it determines YES in step S27, it returns to step S1 of FIG. 4 and then performs the connection establishing process in step S13 of FIG. 5. Thereby when the electric power saving mode is canceled, the device main body automatically goes back to the connection established status.

Figure 6:
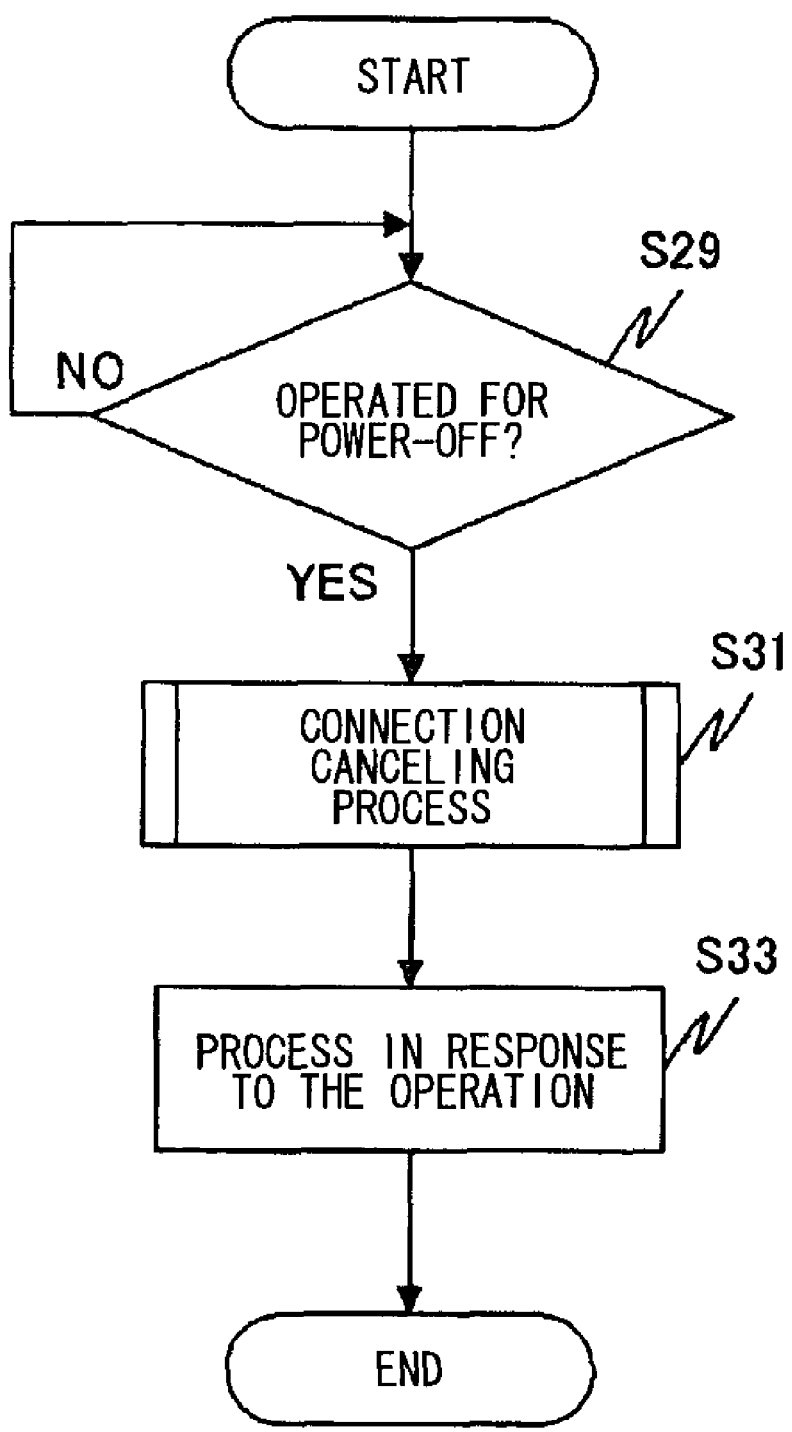
FIG. 6 is a flow chart showing the procedure performed in the connection established status in the electronic camera.

In the host mode process, when the connection establishing process is performed in step S13, a connection canceling process by a power source OFF operation shown in FIG. 6 is performed in parallel. First, it determines whether or not a power source OFF operation is performed in step S29. When it determines YES in this step, it proceeds to step S31 and performs the connection canceling process. Subsequently, proceeding to step S33, it sets the power source of the camera main body to OFF and completes the procedure. When a power source OFF operation is performed during the process of steps S15 to S27 of FIG. 5, the connection canceling process is performed preferentially to set the power source of the camera main body to OFF.

Figure 7:
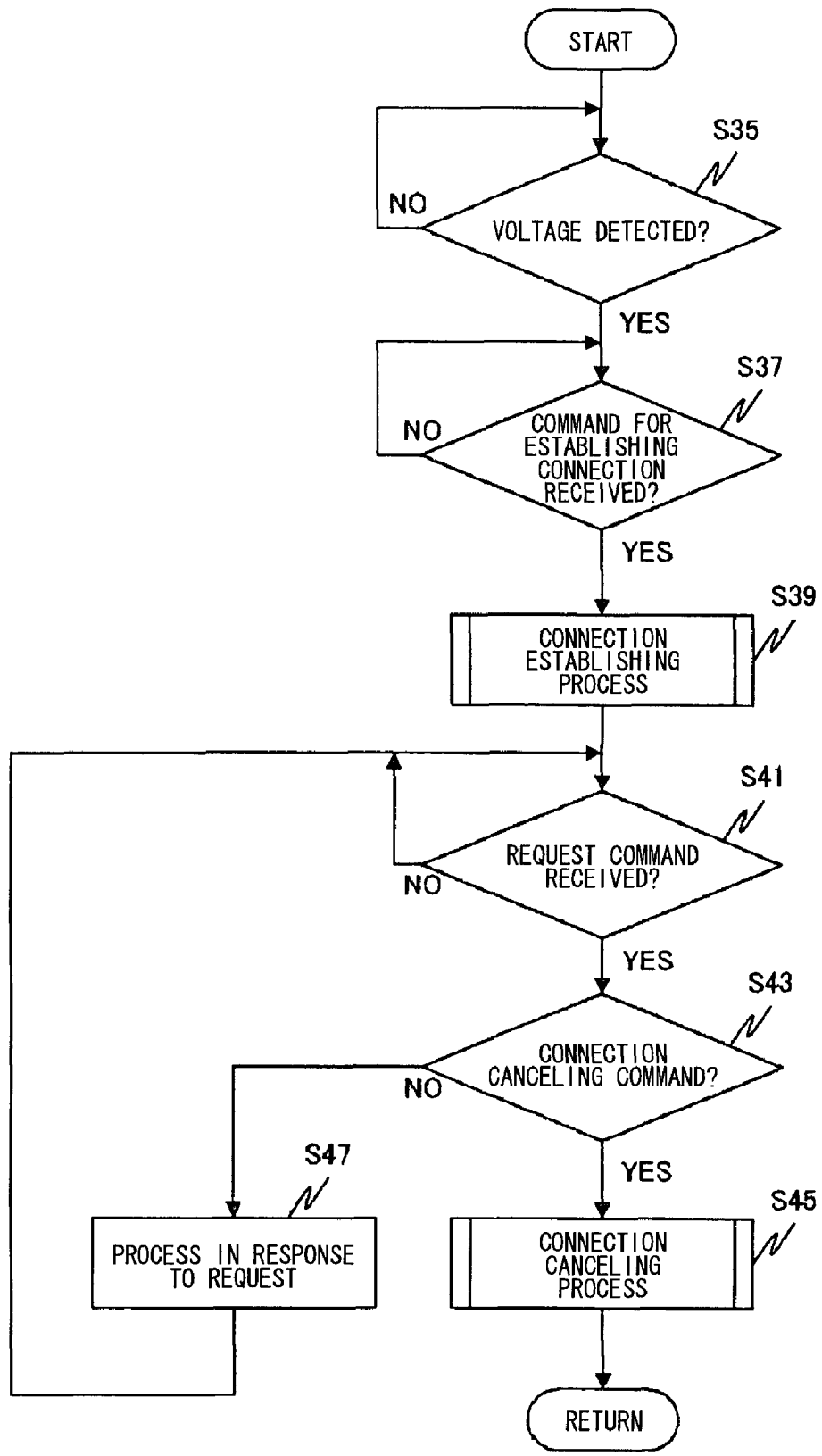
FIG. 7 is a flow chart showing the practical procedure performed in the hard disk device.

Referring to FIG. 7 now, an operation of the CPU 84 of the hard disk device 80 of this embodiment is described below. First, in step S35, it determines whether or not a voltage is applied via the USB interface 82. When it determines YES in step S35, it proceeds to step S37 and determines whether or not a query command or the like from the electronic camera 10 for the connection establishment between the both devices is received. When it determines YES in step S37, it proceeds to step S39 and performs a process for establishing connection with the electronic camera 10 described above.

Subsequently, proceeding to step S41, it determines whether or not a request command from the electronic camera 10 such as a command to request transferring the FAT information or stored data and a command to request connection canceling is received. When it determines YES in this step, it proceeds to step S43 and determines whether or not the received request command is a request command for connection canceling. When the received request command is for transfer of the FAT information or stored data and it determines NO in step S43, it proceeds to step S47 and performs a process in response to the request command, followed by returning to the step S41. In contrast, when the received request command is for connection canceling and it determines YES in step S43, it proceeds to step S45 and performs the connection canceling process to complete the procedure.

As described above, in the imaging device according to this embodiment, before the electronic camera 10 shifts to the electric power saving mode, the latest FAT information is surely supplied from the electronic camera 10 to the hard disk device 80 and then the connection established status is canceled. Therefore, even if the user unplugs a USB cable from the cradle 50 or the hard disk device 80 when the electronic camera 10 is set to the electric power saving mode, mistaking it for the power source OFF status, the stored data recorded in the hard disk device 80 will not be destroyed.

Although the present invention is implemented in an imaging device including the electronic camera 10 and the cradle 50 in the embodiment described above, it is also possible to implement the present invention in an imaging device consisting of only an electronic camera. In an embodiment of the present invention with an imaging device consisting of only an electronic camera, the electronic camera and an external recording device such as a hard disk device are connected to each other through a USB cable.

What is claimed is:

1. An imaging device comprising:
   a first interface that connects to an external memory, not comprised within said imaging device;
   a control circuit that controls data communication with the external memory-connected to the first interface; and
   an information storage unit that stores data management information of data recorded in the external memory,
   wherein the control circuit comprises:
   a connection establisher that realizes a connection established status by performing a connecting process to establish connection with the external memory;

an information acquirer that acquires the data management information from the external memory to store the data management information in the information storage in the connection established status;

an information supplier that supplies the data management information stored in the information storage to the external memory in the connection established status;

an electric power saving mode setter that sets a main body of the imaging device to an electric power saving mode in which operation of part of the main body of the imaging device stops; and a connection canceller that cancels the connection established status before or at the time of setting the main body of the imaging device to the electric power saving mode, after making the information supplier execute the data management information supply operation or after verifying completion of the data management information supply operation by the information supplier.

2. The imaging device according to claim 1, wherein the connection canceller cancels the connection established status after making the information supplier execute the data management information supply operation if it has not executed the operation, or after completion of the data management information supply operation by the information supplier if it is in execution.

3. The imaging device according to claim 1, wherein the control circuit comprises an electric power saving mode canceller that cancels the electric power saving mode, wherein the connection establisher executes the connecting process when the electric power saving mode is canceled by the electric power saving mode canceller.

4. The imaging device according to claim 1, wherein the imaging device is comprised of a camera and a cradle which holds said camera.

5. The imaging device according to claim 4, wherein said first interface is a universal serial bus (USB) interface.

6. The imaging device according to claim 4, wherein said first interface is comprised within said cradle.

7. The imaging device according to claim 4, wherein said cradle further comprises:
an interface that connects to a personal computer; and
an interface that connects to a television monitor.

8. The imaging device according to claim 4, wherein said control circuit is located within said camera.

9. The imaging device according to claim 4, further comprising a second interface for connecting to a memory card.

10. The imaging device according to claim 9, wherein said second interface is located in said camera.

11. An imaging device comprising:
a camera; and
a cradle for holding said camera; said camera further comprising:
a first interface that connects to an external hard disk drive;
a control circuit that controls data communication with the external hard disk drive connected to the first interface; and
an information storage unit that stores data management information of data recorded in the external hard disk drive,
wherein the control circuit comprises:
a connection establisher that realizes a connection established status by performing a connecting process to establish connection with the external hard disk drive;
an information acquirer that acquires the data management information from the external hard disk drive to store the data management information in the information storage in the connection established status;
an information supplier that supplies the data management information stored in the information storage to the external hard disk drive in the connection established status;
an electric power saving mode setter that sets the camera to an electric power saving mode in which operation of part of the camera is turned off; and
a connection canceller that cancels the connection established status before or at the time of setting the camera to the electric power saving mode, after making the information supplier execute the data management information supply operation or after completion of the data management information supply operation by the information supplier.

12. The imaging device according to claim 11, wherein said first interface is a universal serial bus (USB) interface.

13. The imaging device according to claim 11, wherein said first interface is comprised within said cradle.

14. The imaging device according to claim 11, wherein said cradle further comprises:
an interface that connects to a personal computer; and
an interface that connects to a television monitor.

15. The imaging device according to claim 11, further comprising a second interface that connects to a memory card.

16. The imaging device according to claim 15, wherein said second interface is located in said camera.

* * * * *